United States Patent
Spitz et al.

(10) Patent No.: US 10,726,458 B2
(45) Date of Patent: Jul. 28, 2020

(54) PEER-ASSISTED SHOPPING

(71) Applicant: AiBUY, Inc., Dallas, TX (US)

(72) Inventors: Rick Spitz, Amherst, NH (US); Sergey Sundukovskiy, Redondo Beach, CA (US); Delfino Galindo, Jr., Austin, TX (US); Todd Downing, Irving, TX (US); Christian Briggs, Austin, TX (US)

(73) Assignee: AiBUY, Inc., Dallas, TX (US)

( * ) Notice: Subject to any disclaimer, the term of this patent is extended or adjusted under 35 U.S.C. 154(b) by 5 days.

(21) Appl. No.: 15/443,397

(22) Filed: Feb. 27, 2017

(65) Prior Publication Data

US 2018/0018724 A1 Jan. 18, 2018

Related U.S. Application Data (63) Continuation of application No. 13/923,089, filed on Jun. 20, 2013, now Pat. No. 9,607,330.

(60) Provisional application No. 61/662,765, filed on Jun. 21, 2012.

(51) Int. Cl.
  *G06Q 30/00* (2012.01)
  *G06Q 30/06* (2012.01)

(52) U.S. Cl.
  CPC ......... *G06Q 30/0613* (2013.01); *G06Q 30/06* (2013.01); *G06Q 30/0631* (2013.01)

(58) Field of Classification Search
  None
  See application file for complete search history.

(56) References Cited

U.S. PATENT DOCUMENTS

| | | |
|---|---|---|
| 5,715,400 A | 2/1998 | Reimer et al. |
| 5,774,664 A | 6/1998 | Hidary et al. |
| 5,778,181 A | 7/1998 | Hidary et al. |
| 5,903,816 A | 5/1999 | Broadwin et al. |
| 5,929,849 A | 7/1999 | Kikinis |
| 6,006,257 A | 12/1999 | Slezak |
| 6,009,410 A | 12/1999 | LeMole et al. |
| 6,014,638 A | 1/2000 | Burge et al. |

(Continued)

FOREIGN PATENT DOCUMENTS

| | | |
|---|---|---|
| CN | 1581187 A | 2/2005 |
| CN | 101772779 A | 7/2010 |

(Continued)

OTHER PUBLICATIONS

Office Action for U.S. Appl. No. 12/363,713, dated Oct. 3, 2011.

(Continued)

*Primary Examiner* — Mila Airapetian (57) ABSTRACT

According to an embodiment of the disclosure, a method for peer-assisted shopping, the method includes initiating, on a first endpoint corresponding to a first user, a display of media content. The method also includes initiating, on the first endpoint, an interactive feature configured to allow the first user to interact with the first endpoint in response to the display of media content. The method further includes initiating, on the first endpoint, an option for the first user to invoke a communication request with at least a second user corresponding to at least a second endpoint. Moreover, the method includes, upon selection of the option, initiating a connection request with the at least a second endpoint.

18 Claims, 5 Drawing Sheets

(56) References Cited

U.S. PATENT DOCUMENTS

| | | | |
|---|---|---|---|
| 6,018,768 A | 1/2000 | Ullman et al. |
| 6,154,771 A | 11/2000 | Rangan et al. |
| 6,169,573 B1 | 1/2001 | Sampath-Kumar et al. |
| 6,188,398 B1 | 2/2001 | Collins-Rector et al. |
| 6,233,682 B1 | 5/2001 | Fritsch |
| 6,240,555 B1 | 5/2001 | Shoff et al. |
| 6,263,505 B1 | 7/2001 | Walker et al. |
| 6,275,989 B1 | 8/2001 | Broadwin et al. |
| 6,282,713 B1 | 8/2001 | Kitsukawa et al. |
| 6,321,209 B1 | 11/2001 | Pasquali |
| 6,330,595 B1 | 12/2001 | Ullman et al. |
| 6,357,042 B2 | 3/2002 | Srinivasan et al. |
| 6,536,041 B1 | 3/2003 | Knudson et al. |
| 6,553,566 B1 | 4/2003 | Grant et al. |
| 6,564,380 B1 | 5/2003 | Murphy |
| 6,573,907 B1 | 6/2003 | Madrane |
| 6,628,307 B1 | 9/2003 | Fair |
| 6,766,528 B1 | 7/2004 | Kim et al. |
| 6,857,010 B1 | 2/2005 | Cuijpers et al. |
| 6,910,049 B2 | 6/2005 | Fenton et al. |
| 6,912,726 B1 | 6/2005 | Chen et al. |
| 6,941,575 B2 | 9/2005 | Allen |
| 6,976,028 B2 | 12/2005 | Fenton et al. |
| 6,990,498 B2 | 1/2006 | Fenton et al. |
| 7,000,242 B1 | 2/2006 | Haber |
| 7,017,173 B1 | 3/2006 | Armstrong et al. |
| 7,072,683 B2 | 7/2006 | King et al. |
| 7,136,853 B1 | 11/2006 | Kohda et al. |
| 7,158,676 B1 | 1/2007 | Rainsford |
| 7,162,263 B2 | 1/2007 | King et al. |
| 7,168,051 B2 | 1/2007 | Robinson et al. |
| 7,188,186 B1 | 3/2007 | Meyer et al. |
| 7,207,057 B1 | 4/2007 | Rowe |
| 7,222,163 B1 | 5/2007 | Girouard et al. |
| 7,231,651 B2 | 6/2007 | Pong |
| 7,243,139 B2 | 7/2007 | Ullman et al. |
| 7,254,622 B2 | 8/2007 | Nomura et al. |
| 7,269,837 B1 | 9/2007 | Redling et al. |
| 7,331,057 B2 | 2/2008 | Eldering et al. |
| 7,353,186 B2 | 4/2008 | Kobayashi |
| 7,409,437 B2 | 8/2008 | Ullman et al. |
| 7,412,406 B2 | 8/2008 | Rosenberg |
| 7,432,768 B2 | 10/2008 | Han et al. |
| 7,444,659 B2 | 10/2008 | Lemmons |
| 7,464,344 B1 | 12/2008 | Carmichael et al. |
| 7,485,397 B2 | 2/2009 | Eck et al. |
| 7,487,112 B2 | 2/2009 | Barnes, Jr. |
| 7,509,340 B2 | 3/2009 | Fenton et al. |
| 7,539,738 B2 | 5/2009 | Stuckman et al. |
| 7,574,381 B1 | 8/2009 | Lin-Hendel |
| 7,593,965 B2 | 9/2009 | Gabriel |
| 7,613,691 B2 | 11/2009 | Finch |
| 7,614,013 B2 | 11/2009 | Dollar et al. |
| 7,624,416 B1 | 11/2009 | Vandermolen et al. |
| 7,631,327 B2 | 12/2009 | Dempski et al. |
| 7,661,121 B2 | 2/2010 | Smith et al. |
| 7,664,678 B1 | 2/2010 | Haber |
| 7,673,017 B2 | 3/2010 | Kim et al. |
| 7,691,666 B2 | 4/2010 | Levy et al. |
| 7,721,307 B2 | 5/2010 | Hendricks et al. |
| 7,725,362 B2 | 5/2010 | Weathers, Jr. |
| 7,739,596 B2 | 6/2010 | Clarke-Martin et al. |
| 7,747,037 B2 | 6/2010 | Hein, III |
| 7,750,343 B2 | 7/2010 | Choi et al. |
| 7,756,758 B2 | 7/2010 | Johnson et al. |
| 7,769,827 B2 | 8/2010 | Girouard et al. |
| 7,769,830 B2 | 8/2010 | Stuckman et al. |
| 7,773,093 B2 | 8/2010 | Bates et al. |
| 7,774,161 B2 | 8/2010 | Tischer |
| 7,774,815 B1 | 8/2010 | Allen |
| 7,796,941 B2 | 9/2010 | Poltorak |
| 7,800,102 B2 | 9/2010 | Park et al. |
| 7,804,506 B2 | 9/2010 | Bates et al. |
| 7,818,763 B2 | 10/2010 | Sie et al. |
| 7,870,592 B2 | 1/2011 | Hudson et al. |
| 7,885,951 B1 | 2/2011 | Rothschild |
| 7,892,216 B2 | 2/2011 | Fangrow, Jr. |
| 7,899,719 B2 | 3/2011 | Lin-Hendel |
| 7,912,753 B2 | 3/2011 | Struble |
| 7,923,722 B2 | 4/2011 | Ryu et al. |
| 7,923,772 B2 | 4/2011 | Mauder et al. |
| 7,925,973 B2 | 4/2011 | Allaire et al. |
| 7,946,492 B2 | 5/2011 | Rohs |
| 7,975,020 B1 | 7/2011 | Green et al. |
| 7,975,062 B2 | 7/2011 | Krikorian et al. |
| 7,979,877 B2 | 7/2011 | Huber et al. |
| 7,982,216 B2 | 7/2011 | Imai |
| 7,987,098 B2 | 7/2011 | Schifone |
| 7,987,483 B1 | 7/2011 | Des Jardins |
| 8,001,116 B2 | 8/2011 | Cope |
| 8,001,577 B2 | 8/2011 | Fries |
| 8,006,265 B2 | 8/2011 | Redling et al. |
| 8,010,408 B2 | 8/2011 | Rubinstein et al. |
| 8,032,421 B1 | 10/2011 | Ho et al. |
| 8,055,688 B2 | 11/2011 | Giblin |
| 8,091,103 B2 | 1/2012 | Cope |
| 8,108,257 B2 | 1/2012 | Sengamedu |
| 8,117,281 B2 | 2/2012 | Robinson et al. |
| 8,122,480 B2 | 2/2012 | Sholtis |
| 8,132,486 B1 | 3/2012 | Calvert |
| 8,141,112 B2 | 3/2012 | Cope et al. |
| 8,150,743 B2 * | 4/2012 | Brown .................. G06Q 30/02 705/26.1 |
| 8,181,212 B2 | 5/2012 | Sigal |
| 8,196,162 B2 | 6/2012 | Van De Klashorst |
| 8,234,218 B2 | 7/2012 | Robinson et al. |
| 8,244,830 B2 | 8/2012 | Robinson et al. |
| 8,312,486 B1 | 11/2012 | Briggs et al. |
| 8,316,450 B2 | 11/2012 | Robinson et al. |
| 8,341,152 B1 | 12/2012 | Bates |
| 8,356,077 B2 | 1/2013 | Robinson et al. |
| 8,423,467 B1 | 4/2013 | Johansson et al. |
| 8,433,611 B2 | 4/2013 | Lax et al. |
| 8,438,646 B2 | 5/2013 | Sidi |
| 8,458,053 B1 | 6/2013 | Buron et al. |
| 8,468,562 B2 | 6/2013 | Miller et al. |
| 8,549,555 B2 | 10/2013 | Briggs et al. |
| 8,615,474 B2 | 12/2013 | Avedissian et al. |
| 8,635,169 B2 | 1/2014 | Avedissian et al. |
| 8,639,621 B1 | 1/2014 | Ellis et al. |
| 8,645,214 B2 | 2/2014 | Hipolito et al. |
| 8,645,217 B2 | 2/2014 | Siegel et al. |
| 8,645,991 B2 | 2/2014 | McIntire et al. |
| 8,655,146 B2 | 2/2014 | Bennett et al. |
| 8,682,809 B2 | 3/2014 | Avedissian et al. |
| 8,707,185 B2 * | 4/2014 | Robinson .............. G06F 3/0481 705/319 |
| 8,708,223 B2 | 4/2014 | Gates et al. |
| 8,725,826 B2 | 5/2014 | Robinson et al. |
| 8,752,083 B2 | 6/2014 | Geer, III et al. |
| 8,769,016 B2 | 7/2014 | Jakobson |
| 8,769,053 B2 | 7/2014 | Spitz et al. |
| 8,769,584 B2 | 7/2014 | Neumeier et al. |
| 8,782,690 B2 | 7/2014 | Briggs et al. |
| 8,813,132 B2 | 8/2014 | Andrews, II et al. |
| 8,818,941 B2 | 8/2014 | Kiilerich et al. |
| 8,893,173 B2 | 11/2014 | Briggs et al. |
| 9,451,010 B2 | 9/2016 | Spitz et al. |
| 9,607,330 B2 | 3/2017 | Spitz et al. |
| 10,171,555 B2 | 1/2019 | Spitz et al. |
| 2002/0059196 A1 | 5/2002 | I'Anson et al. |
| 2002/0062481 A1 | 5/2002 | Slaney et al. |
| 2002/0075332 A1 | 6/2002 | Geilfuss, Jr. et al. |
| 2002/0083447 A1 | 6/2002 | Heron et al. |
| 2002/0083469 A1 | 6/2002 | Jeannin et al. |
| 2002/0126990 A1 | 9/2002 | Rasmussen et al. |
| 2002/0199181 A1 | 12/2002 | Allen |
| 2003/0023490 A1 | 1/2003 | Lenyon et al. |
| 2003/0028873 A1 | 2/2003 | Lemmons |
| 2003/0055723 A1 | 3/2003 | English |
| 2003/0135563 A1 | 7/2003 | Bodin et al. |
| 2003/0149983 A1 | 8/2003 | Markel |
| 2003/0163832 A1 | 8/2003 | Tsuria et al. |
| 2003/0228615 A1 | 12/2003 | Rossi et al. |

(56) References Cited

U.S. PATENT DOCUMENTS

| | | |
|---|---|---|
| 2003/0231851 A1 | 12/2003 | Rantala et al. |
| 2004/0021684 A1 | 2/2004 | Millner |
| 2005/0022226 A1 | 1/2005 | Ackley et al. |
| 2005/0033656 A1 | 2/2005 | Wang et al. |
| 2005/0076372 A1 | 4/2005 | Moore et al. |
| 2005/0091107 A1 | 4/2005 | Blum |
| 2006/0009243 A1 | 1/2006 | Dahan et al. |
| 2006/0010171 A1 | 1/2006 | Lei |
| 2006/0089843 A1 | 4/2006 | Flather |
| 2006/0122895 A1 | 6/2006 | Abraham et al. |
| 2006/0136305 A1 | 6/2006 | Fitzsimmons et al. |
| 2006/0202191 A1 | 9/2006 | Gerlach et al. |
| 2006/0242016 A1 | 10/2006 | Chenard |
| 2006/0256133 A1 | 11/2006 | Rosenberg |
| 2006/0265657 A1 | 11/2006 | Gilley |
| 2006/0276266 A1 | 12/2006 | Sullivan |
| 2007/0030080 A1 | 2/2007 | Han et al. |
| 2007/0087489 A1 | 4/2007 | Park et al. |
| 2007/0106646 A1 | 5/2007 | Stern et al. |
| 2007/0150360 A1 | 6/2007 | Getz |
| 2007/0157228 A1 | 7/2007 | Bayer et al. |
| 2007/0180461 A1 | 8/2007 | Hilton |
| 2007/0204308 A1 | 8/2007 | Nicholas et al. |
| 2007/0239546 A1 | 10/2007 | Blum et al. |
| 2007/0241327 A1 | 10/2007 | Kim et al. |
| 2007/0250901 A1 | 10/2007 | McIntire et al. |
| 2007/0266399 A1 | 11/2007 | Sidi |
| 2007/0271149 A1 | 11/2007 | Siegel et al. |
| 2007/0276721 A1 | 11/2007 | Jackson |
| 2007/0288518 A1 | 12/2007 | Crigler et al. |
| 2007/0300263 A1 | 12/2007 | Barton et al. |
| 2007/0300280 A1 | 12/2007 | Turner et al. |
| 2008/0005999 A1 | 1/2008 | Pervan |
| 2008/0012010 A1 | 1/2008 | Myung-Seok et al. |
| 2008/0065990 A1 | 3/2008 | Harrison et al. |
| 2008/0066099 A1 | 3/2008 | Brodersen et al. |
| 2008/0066107 A1 | 3/2008 | Moonka et al. |
| 2008/0097843 A1 | 4/2008 | Menon et al. |
| 2008/0098425 A1 | 4/2008 | Welch |
| 2008/0109306 A1 | 5/2008 | Maigret et al. |
| 2008/0109844 A1 | 5/2008 | Baldeschwieler et al. |
| 2008/0123687 A1 | 5/2008 | Bangalore et al. |
| 2008/0126191 A1 | 5/2008 | Schiavi |
| 2008/0126226 A1 | 5/2008 | Popkiewicz et al. |
| 2008/0126949 A1 | 5/2008 | Sharma |
| 2008/0148283 A1 | 6/2008 | Allen et al. |
| 2008/0149921 A1 | 6/2008 | Choi et al. |
| 2008/0162343 A1 | 7/2008 | Bedier |
| 2008/0177627 A1 | 7/2008 | Cefail |
| 2008/0177630 A1 | 7/2008 | Maghfourian et al. |
| 2008/0235085 A1 | 9/2008 | Kovinsky et al. |
| 2008/0250445 A1 | 10/2008 | Zigmond et al. |
| 2008/0255934 A1 | 10/2008 | Leventhal et al. |
| 2008/0276266 A1 | 11/2008 | Huchital et al. |
| 2008/0281685 A1 | 11/2008 | Jaffe et al. |
| 2008/0294694 A1 | 11/2008 | Maghfourian et al. |
| 2008/0296568 A1 | 12/2008 | Ryu et al. |
| 2008/0306999 A1 | 12/2008 | Finger et al. |
| 2008/0307310 A1 | 12/2008 | Segal et al. |
| 2008/0319852 A1 | 12/2008 | Gardner et al. |
| 2008/0319856 A1 | 12/2008 | Zito et al. |
| 2009/0013347 A1 | 1/2009 | Ahanger et al. |
| 2009/0018904 A1 | 1/2009 | Shipman et al. |
| 2009/0031382 A1 | 1/2009 | Cope |
| 2009/0032809 A1 | 2/2009 | Kim et al. |
| 2009/0043674 A1 | 2/2009 | Minsky et al. |
| 2009/0077598 A1 | 3/2009 | Watson et al. |
| 2009/0083815 A1 | 3/2009 | McMaster et al. |
| 2009/0094339 A1 | 4/2009 | Allen et al. |
| 2009/0119169 A1 | 5/2009 | Chandratillake et al. |
| 2009/0125571 A1 | 5/2009 | Kiilerich et al. |
| 2009/0132349 A1 | 5/2009 | Berkley et al. |
| 2009/0157500 A1 | 6/2009 | Ames et al. |
| 2009/0158322 A1 | 6/2009 | Cope et al. |
| 2009/0199230 A1 | 8/2009 | Kumar et al. |
| 2009/0210790 A1 | 8/2009 | Thomas |
| 2009/0248546 A1 | 10/2009 | Norris et al. |
| 2009/0259563 A1 | 10/2009 | Ruhnke et al. |
| 2009/0265255 A1 | 10/2009 | Jackson et al. |
| 2009/0276805 A1 | 11/2009 | Andrews, II et al. |
| 2009/0319388 A1* | 12/2009 | Yuan ............... G06Q 30/0601 705/26.1 |
| 2009/0320073 A1 | 12/2009 | Reisman |
| 2009/0327891 A1* | 12/2009 | Holm ............... G06F 17/3002 715/716 |
| 2010/0030578 A1 | 2/2010 | Siddique et al. |
| 2010/0114983 A1 | 5/2010 | Robert et al. |
| 2010/0131385 A1 | 5/2010 | Harrang et al. |
| 2010/0145795 A1 | 6/2010 | Haber et al. |
| 2010/0153831 A1 | 6/2010 | Beaton |
| 2010/0169277 A1 | 7/2010 | Shyu et al. |
| 2010/0223107 A1 | 9/2010 | Kim et al. |
| 2010/0247061 A1 | 9/2010 | Bennett et al. |
| 2010/0279766 A1 | 11/2010 | Pliska et al. |
| 2010/0283827 A1 | 11/2010 | Bustamente |
| 2010/0287580 A1 | 11/2010 | Harding et al. |
| 2010/0299616 A1* | 11/2010 | Chen ............... G06Q 10/10 715/753 |
| 2010/0306402 A1 | 12/2010 | Russell et al. |
| 2010/0306805 A1 | 12/2010 | Neumeier et al. |
| 2010/0332329 A1 | 12/2010 | Roberts et al. |
| 2011/0004517 A1 | 1/2011 | Soto et al. |
| 2011/0045852 A1* | 2/2011 | Kovach ............... G06Q 30/02 455/466 |
| 2011/0052144 A1 | 3/2011 | Abbas et al. |
| 2011/0071865 A1 | 3/2011 | Leeds et al. |
| 2011/0133176 A1 | 6/2011 | Lee et al. |
| 2011/0173300 A1 | 7/2011 | Levy et al. |
| 2011/0191809 A1 | 8/2011 | Briggs et al. |
| 2011/0231260 A1 | 9/2011 | Price |
| 2011/0238755 A1 | 9/2011 | Khan et al. |
| 2011/0251897 A1 | 10/2011 | Litvack et al. |
| 2011/0307397 A1 | 12/2011 | Benmbarek |
| 2011/0321096 A1 | 12/2011 | Landow et al. |
| 2012/0030704 A1 | 2/2012 | Schiller et al. |
| 2012/0036048 A1 | 2/2012 | Robb et al. |
| 2012/0079021 A1 | 3/2012 | Roman et al. |
| 2012/0158511 A1 | 6/2012 | Lucero et al. |
| 2012/0185355 A1 | 7/2012 | Kilroy |
| 2012/0201521 A1 | 8/2012 | Frojdh et al. |
| 2012/0222064 A1 | 8/2012 | Geer, III et al. |
| 2012/0227060 A1 | 9/2012 | Allen et al. |
| 2012/0227074 A1 | 9/2012 | Hill et al. |
| 2012/0284607 A1 | 11/2012 | Jones et al. |
| 2012/0296738 A1 | 11/2012 | Leeder |
| 2012/0296739 A1 | 11/2012 | Cassidy et al. |
| 2012/0296782 A1 | 11/2012 | Tsai et al. |
| 2012/0304065 A1 | 11/2012 | Cai |
| 2013/0014137 A1 | 1/2013 | Bhatia et al. |
| 2013/0014155 A1 | 1/2013 | Clarke et al. |
| 2013/0054757 A1 | 2/2013 | Spitz et al. |
| 2013/0110608 A1 | 5/2013 | Cassidy et al. |
| 2013/0117131 A1 | 5/2013 | Robinson et al. |
| 2013/0117409 A1 | 5/2013 | Yang et al. |
| 2013/0144903 A1 | 6/2013 | Andrews, II et al. |
| 2013/0151352 A1 | 6/2013 | Tsai et al. |
| 2013/0152123 A1 | 6/2013 | Briggs et al. |
| 2013/0162655 A1 | 6/2013 | Mueller |
| 2013/0166382 A1 | 6/2013 | Cassidy et al. |
| 2013/0174191 A1* | 7/2013 | Thompson, Jr. ... G06Q 30/0207 725/23 |
| 2013/0183021 A1 | 7/2013 | Osman |
| 2013/0211891 A1 | 8/2013 | Daniel et al. |
| 2013/0212611 A1 | 8/2013 | Van Aacken et al. |
| 2013/0215116 A1 | 8/2013 | Siddique et al. |
| 2013/0218964 A1* | 8/2013 | Jakobson ............... G06Q 30/02 709/204 |
| 2013/0228615 A1 | 9/2013 | Gates et al. |
| 2013/0254018 A1 | 9/2013 | Rao |
| 2013/0290550 A1 | 10/2013 | Bangalore et al. |
| 2014/0019860 A1 | 1/2014 | Sathish et al. |
| 2014/0032366 A1 | 1/2014 | Spitz et al. |
| 2014/0052576 A1* | 2/2014 | Zelenka ............... G06Q 30/00 705/26.41 |

(56) References Cited

U.S. PATENT DOCUMENTS

| | | |
|---|---|---|
| 2014/0095330 A1 | 4/2014 | Briggs et al. |
| 2014/0181208 A1 | 6/2014 | Robinson et al. |
| 2014/0208235 A1 | 7/2014 | Robinson et al. |
| 2014/0250211 A1 | 9/2014 | Spitz et al. |
| 2014/0254942 A1 | 9/2014 | Liu et al. |
| 2014/0282700 A1 | 9/2014 | Briggs et al. |
| 2014/0359671 A1 | 12/2014 | Andrews, II et al. |
| 2015/0039468 A1 | 2/2015 | Spitz et al. |
| 2015/0073919 A1 | 3/2015 | Spitz et al. |
| 2015/0074710 A1 | 3/2015 | Spitz et al. |
| 2015/0074711 A1 | 3/2015 | Spitz et al. |
| 2015/0092111 A1 | 4/2015 | Spitz et al. |
| 2015/0095455 A1 | 4/2015 | Spitz et al. |
| 2017/0195400 A1 | 7/2017 | Spitz et al. |
| 2019/0349416 A1 | 11/2019 | Spitz et al. |

FOREIGN PATENT DOCUMENTS

| | | |
|---|---|---|
| CN | 102160072 A | 8/2011 |
| CN | 102782608 | 11/2012 |
| JP | 2002-007587 | 1/2002 |
| JP | 2002-015208 | 1/2002 |
| JP | 2002-041898 A | 2/2002 |
| JP | 2002-526831 | 8/2002 |
| JP | 2003-530618 | 10/2003 |
| JP | 2004-038694 | 2/2004 |
| JP | 2005-056163 | 3/2005 |
| JP | 2007-020062 | 1/2007 |
| JP | 2007-528051 | 10/2007 |
| JP | 2008-112381 | 5/2008 |
| JP | 2012-186834 A | 9/2012 |
| JP | 2012-527702 | 11/2012 |
| KR | 100824197 B1 | 4/2008 |
| KR | 10-2009-0043730 | 5/2009 |
| KR | 10-2010-0048734 | 5/2010 |
| WO | WO 2001/009756 | 2/2001 |
| WO | WO 2001/069364 | 9/2001 |
| WO | WO 2001/091869 | 12/2001 |
| WO | WO 2005/036875 | 4/2005 |
| WO | WO 2005/039131 | 4/2005 |
| WO | WO 2008/016634 | 2/2008 |
| WO | WO 2009/012580 | 1/2009 |
| WO | WO 2010/009281 | 1/2010 |
| WO | WO 2011/149491 | 12/2011 |
| WO | WO 2013/033239 | 3/2013 |
| WO | WO 2013/192557 | 12/2013 |
| WO | WO 2015/013117 | 1/2015 |
| WO | WO 2015/038795 | 3/2015 |
| WO | WO 2015/038798 | 3/2015 |
| WO | WO 2015/038802 | 3/2015 |
| WO | WO 2015/048375 | 4/2015 |
| WO | WO 2015/048377 | 4/2015 |
| WO | WO 2015/054644 | 4/2015 |

OTHER PUBLICATIONS

Office Action for U.S. Appl. No. 12/363,713, dated Jun. 13, 2012.
Office Action for U.S. Appl. No. 12/787,505, dated Aug. 27, 2014.
Office Action for U.S. Appl. No. 12/787,505, dated Jul. 16, 2015.
Office Action for U.S. Appl. No. 12/787,505, dated Mar. 1, 2013, 10 pages.
International Search Report and Written Opinion for International Patent Application No. PCT/US2010/057567, dated Jun. 24, 2011.
Office Action for U.S. Appl. No. 14/042,477, dated Apr. 10, 2014.
Office Action for U.S. Appl. No. 14/079,385, dated Aug. 27, 2014.
Office Action for U.S. Appl. No. 14/079,385, dated Mar. 3, 2015.
Office Action for U.S. Appl. No. 14/079,385, dated Jul. 1, 2015.
Office Action for U.S. Appl. No. 14/091,219, dated Apr. 11, 2014.
Office Action for U.S. Appl. No. 14/091,219, dated Jul. 21, 2014.
Office Action for U.S. Appl. No. 14/292,423, dated Jan. 9, 2015.
Office Action for U.S. Appl. No. 12/434,569, dated Oct. 2, 2014.
Office Action for U.S. Appl. No. 12/434,569, dated May 4, 2012.
Office Action for U.S. Appl. No. 12/434,569, dated Oct. 25, 2012, 9 pages.
Office Action for U.S. Appl. No. 12/434,569, dated Mar. 15, 2013.
Office Action for U.S. Appl. No. 12/434,569, dated Jul. 18, 2013.
Office Action for U.S. Appl. No. 12/434,569, dated Nov. 19, 2013.
Office Action for U.S. Appl. No. 12/434,569, dated Mar. 20, 2014.
Office Action for U.S. Appl. No. 13/753,384, dated Jul. 9, 2014.
Office Action for U.S. Appl. No. 13/753,384, dated May 17, 2013.
Office Action for U.S. Appl. No. 13/753,384, dated Oct. 25, 2013.
Office Action for U.S. Appl. No. 13/753,384, dated Dec. 20, 2013.
Office Action for Australian Application No. 2012302021, dated Oct. 22, 2015, 3 pages.
Notice of Acceptance for Australian Application No. 2012302021, dated May 4, 2016, 2 pages.
First Office Action for Chinese Application No. 201280053145.7, dated Mar. 1, 2016, 3 pages.
Second Office Action for Chinese Application No. 201280053145.7, dated Aug. 16, 2016, 3 pages.
Supplementary European Search Report for European Application No. 12828677.0, dated Sep. 28, 2015, 7 pages.
Office Action for European Application No. 12828677.0, dated Sep. 14, 2016, 7 pages.
Office Action for Japanese Application No. 2014-528557, dated Jul. 26, 2016, 2 pages.
Office Action for Mexican Application No. MX/a/2014/002490, dated Jun. 10, 2016, 7 pages.
Office Action for Russian Application No. 2014112353, dated Feb. 18, 2016, 2 pages.
International Search Report and Written Opinion for International Application No. PCT/US2012/052897, dated Nov. 14, 2012.
Examination Report No. 1 for Australian Application No. 2016216565, dated Jul. 13, 2017, 2 pages.
Office Action for Canadian Application No. 2,877,567, dated Feb. 29, 2016, 5 pages.
First Office Action for Chinese Application No. 201380043181.X, dated Mar. 31, 2017, 15 pages.
Supplementary European Search Report for European Application No. 13806161.9, dated Jan. 28, 2016, 5 pages.
Office Action for Japanese Application No. 2015-518618, dated Jul. 25, 2017, 7 pages.
Office Action for Mexican Application No. MX/a/2014/015947, dated Mar. 2, 2016, 3 pages.
Office Action for Mexican Application No. MX/a/2014/015947, dated Oct. 11, 2016, 6 pages.
Office Action for Russian Application No. 2015101757, dated Jun. 20, 2017, 2 pages.
Office Action for U.S. Appl. No. 13/923,089, dated Mar. 22, 2016, 11 pages.
Office Action for U.S. Appl. No. 13/923,089, dated Dec. 2, 2014, 5 pages.
Office Action for U.S. Appl. No. 13/923,089, dated Aug. 20, 2014, 10 pages.
International Search Report and Written Opinion for International Patent Application No. PCT/US2013/047124, dated Jan. 10, 2014.
Supplementary European Search Report for European Application No. 14852427.5, dated Apr. 20, 2017, 5 pages.
Office Action for U.S. Appl. No. 14/512,204, dated Dec. 4, 2015, 20 pages.
Office Action for U.S. Appl. No. 14/512,204, dated Jan. 6, 2015, 17 pages.
Office Action for U.S. Appl. No. 14/512,204, dated Jul. 30, 2015, 21 pages.
Office Action for U.S. Appl. No. 14/512,204, dated Aug. 12, 2016, 15 pages.
International Search Report and Written Opinion for International Application No. PCT/US2014/060150, dated Jan. 26, 2015.
International Search Report and Written Opinion for International Application No. PCT/US14/55233, dated Nov. 24, 2014, 5 pages.
International Search Report and Written Opinion for International Application No. PCT/US14/55229, dated Dec. 16, 2014, 6 pages.
International Search Report and Written Opinion for International Application No. PCT/US14/55226, dated Dec. 16, 2014, 6 pages.

(56) References Cited

OTHER PUBLICATIONS

International Search Report and Written Opinion for International Application No. PCT/US2014/057597, dated Jan. 9, 2015, 6 pages.
International Search Report and Written Opinion for International Application No. PCT/US14/57595, dated Dec. 15, 2014, 5 pages.
International Search Report and Written Opinion for International Application No. PCT/US2015/018140, dated Jun. 3, 2015, 9 pages.
International Search Report and Written Opinion for International Application No. PCT/US2015/019979, dated Jul. 30, 2015, 10 pages.
Office Action for U.S. Appl. No. 14/484,047, dated Dec. 18, 2014.
Office Action for U.S. Appl. No. 14/484,047, dated May 18, 2015.
Office Action for U.S. Appl. No. 14/484,065, dated Dec. 19, 2014.
Office Action for U.S. Appl. No. 14/484,065, dated Jul. 17, 2015.
Office Action for U.S. Appl. No. 14/484,225, dated Dec. 26, 2014.
Office Action for U.S. Appl. No. 14/484,225, dated May 21, 2015.
Office Action for U.S. Appl. No. 14/497,686, dated Feb. 24, 2015, 13 pages.
Office Action for U.S. Appl. No. 14/498,800, dated Mar. 27, 2015, 18 pages.
Notification on Results of Estimation of Patentability of Invention dated Feb. 16, 2015 for Russian Patent Application No. 2012105917/08(009063); 7 pages.
Lob, S. et al., "NEMO—The Network Environment for Multimedia Objects," ACM, IITM '10 Proceedings of the First International Conference on Intelligent Interactive Technologies and Multimedia, ISBN 978-1-4503-0408-5, pp. 245-249 (2010) http://doi.acm.orq/10.1145/1963564.1963607.
Masuko, S. et al., "KiTeMiROOM: Fashion Coordinate System for Online Shopping," IPSJ Interaction 2012, Information Processing Society of Japan, Mar. 31, 2012, pp. 807-812 (with English Abstract).
MediaTomb, MediaTomb Scripting [online], Retrieved on Oct. 11, 2015, URL: http://mediatomb.cc/pages/scripting, 24 pages.
Morin, J-H et al., "HyperNews: a commercial electronic newspaper," pp. 147-163 (Nov. 8, 2004).
"Akamai for Media & Entertainment", Akamai Technologies, Inc., 2007, 38 pages.
"Ebd Web Video Player, Increase Online Video Ad Monetization", www.ebdsoft.tv, 2010, 2 pages.
Kongwah Wan, et al., "Advertising Insertion in Sports Webcasts", 2007 IEEE, p. 78-82.
Miguel Helft, "Google Aims to Make YouTube Profitable With Ads", The New York Times, Aug. 22, 2007, 3 pages.
Chris Tomlinson, "Google tries to relive past glories by making YouTube pay for itself", Birmingham Post, Sep. 4, 2007, 3 pages.
John Skidgel, "Producing Flash CS3 Video, Techniques for Video Pros and Web Designers", 2007, 9 pages.
Jan Krikke, "Streaming Video Transforms the Media Industry", IEEE, Jul./Aug. 2004, p. 6-12.
Tao Mei, et al., "VideoSense—Towards Effective Online Video Advertising", Sep. 23-28, 2007, p. 1075-1084.
Dr. Harry van Vliet, "Where Television and Internet meet . . . New experiences for rich media", Jan. 2002, 35 pages.
"IAB Announces Advertising Creative Guidelines for Online Broadband Video Commercials", Nov. 29, 2005, 4 pages.
"Digital Video In-Stream Ad Format Guidelines and Best Practices", Interactive Advertising Bureau, May 2008, 17 pages.
"Broadband Ad Creative Guidelines", Dec. 31, 2006, 3 pages.
Rich Media Guidelines: Fall 2004, Dec. 31, 2006, 3 pages.
"About Rich Media Guidelines Compliance: In-Page Units", Jan. 7, 2007, 2 pages.
"About Rich Media Guidelines Compliance: Over-the-Page Units", Jan. 7, 2007, 2 pages.
"Digital Video Ad Serving Template (VAST), Version 2.0", iab., Nov. 2009, 18 pages. (Redlined).
"Digital Video Ad Serving Template (VAST), Version 2.0", iab., Nov. 2009, 16 pages.
"DART Motif for In-Stream Helps Publishers Improve Efficiency, Push the Envelope with Video Ad Effects and Offer Advertisers Trusted, Reliable Reporting Metrics", Nov. 6, 2006, 3 pages.

"DoubleClick Debuts Video Ad-Serving Solution", Nov. 6, 2006, 2 pages.
Liz Gannes, "YouTube's New Inline Ads: Screenshots", May 11, 2007, 7 pages.
"Final Broadband Ad Creative Guidelines", Interactive Advertising Bureau, Standards & Guidelines, 4 pages.
"Content distributors can shopping-enable video content", www.web.archive.org, Apr. 27, 2007, 1 page.
Dan Kaplan, "Delivery Agent lets you buy products in your favorite TV shows", www.web.archive.org, May 4, 2007, 4 pages.
"Shopisodes Enable You to Dress Like Your Favorite TV Character", www.web.archive.org, Oct. 26, 2007, 1 page.
Jesse Liebman, "Reality TV That's Social, Bravo!", www.web.archive.org, Dec. 22, 2008, 6 pages.
Reid et al.; "An Analysis of Anonymity in the Bitcoin System"; http://arxiv.org/pdf/1107.4524.pdf; May 7, 2012; 29 pages.
Office Action for Canadian Application No. 2,847,262, dated Jul. 4, 2018, 4 pages.
Office Action for Canadian Application No. 2,847,262, dated Jun. 19, 2019, 4 pages.
Extended European Search Report for European Application No. 18198927.8, dated Apr. 15, 2019, 10 pages.
Office Action for U.S. Appl. No. 15/234,863, dated Oct. 18, 2017, 9 pages.
Examination Report No. 1 for Australian Application No. 2013277992, dated Nov. 23, 2017, 3 pages.
Second Office Action for Chinese Application No. 201380043181.X, dated Nov. 24, 2017, 15 pages.
Office Action for European Application No. 13806161.9, dated Feb. 6, 2019, 11 pages.
Examination Report No. 1 for Australian Application No. 2014331699, dated May 31, 2019, 4 pages.
First Office Action for Chinese Application No. 201480055045.7, dated Jan. 17, 2019, 9 pages.
Notice of Reasons for Rejection for Japanese Application No. 2016-547982, dated Jun. 21, 2018, 4 pages.
Notice of Reasons for Rejection for Japanese Application No. 2016-547982, dated Apr. 18, 2019, 6 pages.
Office Action for U.S. Appl. No. 14/512,204, dated Dec. 27, 2017, 14 pages.
Office Action for U.S. Appl. No. 14/512,204, dated Jan. 25, 2019, 16 pages.
Wikipedia, "Content delivery network," [Online], Mar. 24, 2008, Retrieved from the Internet: <URL: http://en.wikipedia.org/w/index.php?title=Content_delivery_network&oldid=601009970>, Retrieved on Nov. 17, 2014, 8 pages.
Notice of Preliminary Rejection for Korean Application No. 10-2019-7022867, dated Sep. 10, 2019, 5 pages.
Office Action for U.S. Appl. No. 16/215,138, dated Sep. 18, 2019, 8 pages.
Second Office Action for Chinese Application No. 201480055045.7, dated Sep. 18, 2019, 23 pages.
Office Action for U.S. Appl. No. 14/512,204, dated Oct. 30, 2019, 17 pages.
Notice of Preliminary Rejection for Korean Application No. 10-2015-7001303, dated Nov. 28, 2019, 14 pages.
Office Action for Indian Application No. 2406/CHENP/2014, dated Dec. 31, 2019, 7 pages.
Office Action for Australian Application No. 2019201260, dated Nov. 20, 2019, 4 pages.
Second Office Action for Chinese Application No. 201480055045.7, dated Apr. 27, 2020, 15 pages.
Anonymous, Shop Alone No Longer: FriendShopper.com Brings the Live Shopping Experience to E-commerce: New Online Shopping Platform Connects Friends in Real-Time, Jul. 2009, PR Newswire, 3 pages.
Notice of Allowance for U.S. Appl. No. 14/512,204, dated May 14, 2020, 21 pages.

* cited by examiner

PEER-ASSISTED SHOPPING

CROSS-REFERENCE TO RELATED APPLICATION(S) AND CLAIM OF PRIORITY

The present application is a continuation of U.S. patent application Ser. No. 13/923,089 filed Jun. 20, 2013, entitled "PEER-ASSISTED SHOPPING," which claims priority to and benefit of U.S. Provisional Patent Application Ser. No. 61/662,765, filed Jun. 21, 2012, entitled "PEER-ASSISTED SHOPPING." The content of the above-identified patent documents is incorporated herein by reference.

TECHNICAL FIELD

The present disclosure is directed, in general, to software, and more specifically, to peer-assisted shopping.

BACKGROUND

With the advent of shopping on the internet, shoppers have lost a fundamental feature—instant feedback from a companion that is shopping with them.

SUMMARY

According to an embodiment of the present disclosure, systems and devices are disclosed for enabling peer-assisted shopping.

According to an embodiment of the disclosure, a method for peer-assisted shopping, the method includes initiating, on a first endpoint corresponding to a first user, a display of media content. The method also includes initiating, on the first endpoint, an interactive feature configured to allow the first user to interact with the first endpoint in response to the display of media content. The method further includes initiating, on the first endpoint, an option for the first user to invoke a communication request with at least a second user corresponding to at least a second endpoint. Moreover, the method includes, upon selection of the option, initiating a connection request with the at least a second endpoint.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The FIGURES, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Figure 1:
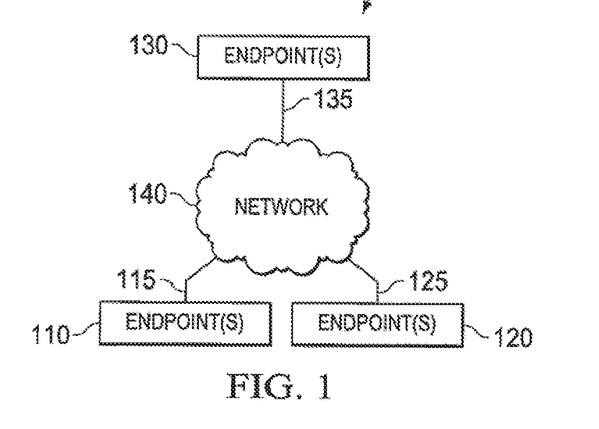
FIG. 1 is a simplified block diagram illustrative of a communication system that can be utilized to facilitate communication between endpoint(s) and endpoint(s) through a communication network, according to particular embodiments of the disclosure.

FIG. 1 is a simplified block diagram illustrative of a communication system 100 that can be utilized to facilitate communication between endpoint(s) 110, endpoint(s) 120, and 130 through a communication network 140, according to particular embodiments of the disclosure. As used herein, "endpoint" may generally refer to any object, device, software, or any combination of the preceding that is generally operable to communicate with another endpoint. The endpoint(s) may represent a user, which in turn may refer to a user profile representing a person. The user profile may comprise, for example, an address for the user, a user name, a passcode, other user information, or any combination of the preceding. Additionally, the endpoint(s) may represent a device that comprises any hardware, software, firmware, or combination thereof operable to communicate through the communication network 140.

Examples of an endpoint(s) include, but are not necessarily limited to, a computer or computers (including servers, applications servers, enterprise servers, desktop computers, laptops, netbooks, tablet computers (e.g., IPAD), a switch, mobile phones (e.g., including IPHONE and ANDROID-based phones), networked glasses (e.g., GOOGLE GLASS)), networked televisions, networked disc players, components in a cloud-computing network, or any other device or component of such device suitable for communicating information to and from the communication network 140. Endpoints may support Internet Protocol (IP) or other suitable communication protocols. Endpoints may additionally include a medium access control (MAC) and a physical layer (PHY) interface that conforms to IEEE 701.11. If the endpoint is a device, the device may have a device identifier such as the MAC address and may have a device profile that describes the device.

The communication network 140 and links 115, 125, and 135 to the communication network 140 may include, but are not limited to, a public or private data network; a telephony network, a local area network (LAN); a metropolitan area network (MAN); a wide area network (WAN); a wireline or wireless network (GSM, CDMA, LTE, WIMAX, or the like); a local, regional, or global communication network;

portions of a cloud-computing network; a communication bus for components in a system; an optical network; a satellite network; an enterprise intranet; other suitable communication links; or any combination of the preceding. In particular embodiments, portions of the links 115, 125, 135 or communication network 140 may be on the Internet.

Although endpoint generally appears as being in a single location, the endpoint(s) may be geographically dispersed, for example, in cloud computing scenarios. As used in this document, "each" may refer to each member of a set or each member of a subset of a set.

When the endpoints(s) 110, 120, 130 communicate with one another, any of a variety of security schemes may be utilized. As an example, in particular embodiments, endpoint(s) 120 may represent a client and endpoint(s) 130 may represent a server in client-server architecture. The server and/or servers may host a website. And, the website may have a registration process whereby the user establishes a username and password to authenticate or log in to the website. The website may additionally utilize a web application for any particular application or feature that may need to be served up to the website for use by the user.

Additionally, in particular configurations, the communication between endpoints 110 and 120 may be facilitated through a communication path through endpoint 130.

Various embodiments described herein may avail benefits from and/or utilize Cinsay, Inc.'s ("Cinsay") Smart Container™ Technology, which is briefly described below and is also described in U.S. application Ser. No. 13/598,443 filed Aug. 29, 2012 and claiming priority to several provisional applications. Cinsay, the Applicant, provides an innovative new method for merchants to reach their customers online. In the traditional online sales model, merchants need to create search or display ads which show up when online consumers visit search engine sites or various web properties. If the consumer sees an interesting ad related to a product or service, they need to leave their current activity and visit some other web destination to discover more information or make an online purchase. Consumers have specific online behavior patterns. If they are actively shopping, then the traditional multistep model is workable. The traditional advertising sales model requires that the consumer stop what they are doing and visit some other online destination. However, if they are on a social site interacting with friends, reading the news, playing games, or engaged in other online activities, then are much less likely to leave their current activity to visit some external internet destination.

The Cinsay Smart Container™ model brings the product information or store to the consumer. Cinsay utilizes an innovative new Smart Container™ code/technology that virally syndicates across the web, for, example using components described with reference to FIGS. 1 and 8 or using other components. It is ideal for those types of destinations that online consumers tend to frequent such as social networks and blogs. Regardless, if the Smart Container™ code is located on a web page, a blog article, a social network page or wall, or a mobile device, they can complete their transaction right there with no need to be diverted to some external destination.

Smart Container™ objects are intelligent internet objects that virally syndicate and propagate across the web and other connected network and the mobile devices. They can be configured in a variety of ways to address the entire value chain of online marketing and shopping. This includes impressions, clicks, lead generation, and performing e-commerce transactions. A modern shopping experience works best when interactive media is used. One of the most appealing forms of media for sales and shopping is video. It allows a much more lifelike representation than text or static pictures. It also creates a much richer product browsing or shopping experience.

Cinsay's Smart Container™ code is normally configured with a video player window, a selection of products or services being offered, and a variety of related video clips. This collection of video clips allows the consumer to learn more about the products or services being offered. The consumer can select any of those offered items to get more details, all enclosed within the Smart Container™ technology.

These offered items (products or services) may be items being advertised or sold. Depending on the type, the Smart Container™ code may allow the consumer to request to be contacted, or even purchase the object, right there. The consumer need not leave their current activity or web page. The offered items could also include getting discounts or coupons. They may even be an opportunity to donate to a charity or political campaign. Of course, sometimes it does make sense to visit another internet designation, and if appropriate, the consumer can certainly be linked there as well.

Because the Smart Container™ code handles all the complexity, it can turn the simplest web site into an instant e-commerce store. This enables anyone to transact online without having to deal with the complexity of setting up an e-commerce site. For merchants with an e-commerce site, it readily enables a much richer shopping experience. For the creative hobbyist or local band, it lets them readily sell directly to interested consumers. To support and promote them, Cinsay offers supplemental items in their Smart Container™ code called On-Demand™ merchandise. Merchants can custom design a selection of apparel with their art and graphics to be sold along with their own creations. Cinsay's On-Demand™ fulfillment will dynamically produce & ship their custom apparel for them, eliminating the need to manage inventory, and provide their online customers with a richer line of products. Of course because their instant e-commerce store is based on Smart Container™ objects, it can also propagate out onto all forms of viral syndication methods as well.

The Cinsay Smart Container™ code is also auto customizing, according to particular configurations. If the device is a traditional PC or laptop, it will render using the optimal technology, which for this purpose which is usually flash. On mobile devices, such as IPhones, IPads, or Android phones, this means HTML5 or a native interactive app will likely get used. The items in the Smart Container™ code also know about each other, according to particular configurations. When a video is playing, the container can update the product and service objects being shown that correspond with the particular sequence in a video segment. It allows a mini QVC shopping channel to be created and syndicated across the internet. Beyond device type, there are other dimensions of customization. Smaller devices and some environments such as social site restrict window sizes, so the Smart Container™ code adapts. In addition, it may be appropriate to provide different content based on geo-location, so the Smart Container™ code can customize for these as well.

Cinsay Smart Container™ code virally syndicate across the internet following the more popular network paths. They can be hosted on traditional web pages, blogs, contained in emails, operate on mobile devices, or propagate social networks. Because the Smart Container™ code is flexible, they can also be setup in the form factor of a display ad unit and distributed via ad servers on display advertising networks. When the code exists on social networks like Facebook, they can ride the wave of user "likes." For example, if a woman shopper likes some great shoes shown in a Smart Container™ object interface, the Smart Container™ object can propagate directly to their "wall." Now all their friends see the Cinsay smart object, and can view or transact right there on their own wall. Of course, if any of their friends also "like" it, the Cinsay Smart Container™ object propagates and rides the wave further out into that branch of the social network yielding a potential exponential growth factor. Maybe the container does not involve products like shoes, but instead supports a politician running for office. Their supporters may be passionate about the message and "like" it, again making it available to their network Now, similarly minded political supporters can view those messages too, and if so moved donate to the cause.

Another example is sports. In this case, a sports fan may wish to watch that content on their HD large screen TV. More and more have interconnected devices such as a Roku device, and Cinsay Smart Container™ code may be sent to such and IP TV box as well.

When merchants launch and syndicate their Smart Container™ objects onto the internet, they what to know how their campaign is performing. Cinsay Smart Container™ object reports back status on events and transactions of interest such as impressions, video views, clicks, leads, and sales. All such events/transactions can be sent back as events occur, providing details on how they are doing. Because the containers are smart, they can be instructed to change behavior, offer different clips, update products, or to end when it is time to stop the marketing or sales campaign.

Another form of tracking relates to how the Cinsay Smart Container™ code is propagated. A merchant may wish to use affiliates to help syndicate them, and pay them a percentage based on the transactions resulting from their work. Cinsay Smart Container™ objects can be tagged with affiliate tracking identifiers allowing status reports and transactions from that container instance or its descendants to be properly filtered. Another tracking usage may be for a politician to assign affiliate codes to their supporters and be able to measure whose efforts result in the most new supporters.

Cinsay Smart Container™ objects are designed to be highly scalable according to particular configurations. Rather than burden a single website with massive traffic which would result from a traditional model of bringing all consumers to the store, Cinsay Smart Container™ code operates in a distributed manner. Cinsay Smart Container™ code execute where they are, on blog, social network or mobile device. They fetch their instructions when started, and then gather their product items and video streams from a worldwide distributed content delivery network. This results in highly scalable architecture allowing millions of concurrent consumers.

By bringing the store to the customer, Cinsay Smart Container™ code enables many new ways for merchants to connect with their consumers without disrupting the consumer's web activities. The end result is to connect the consumer directly with the merchant eliminating the middleman and promoting a much more natural shopping experience.

Figure 8:
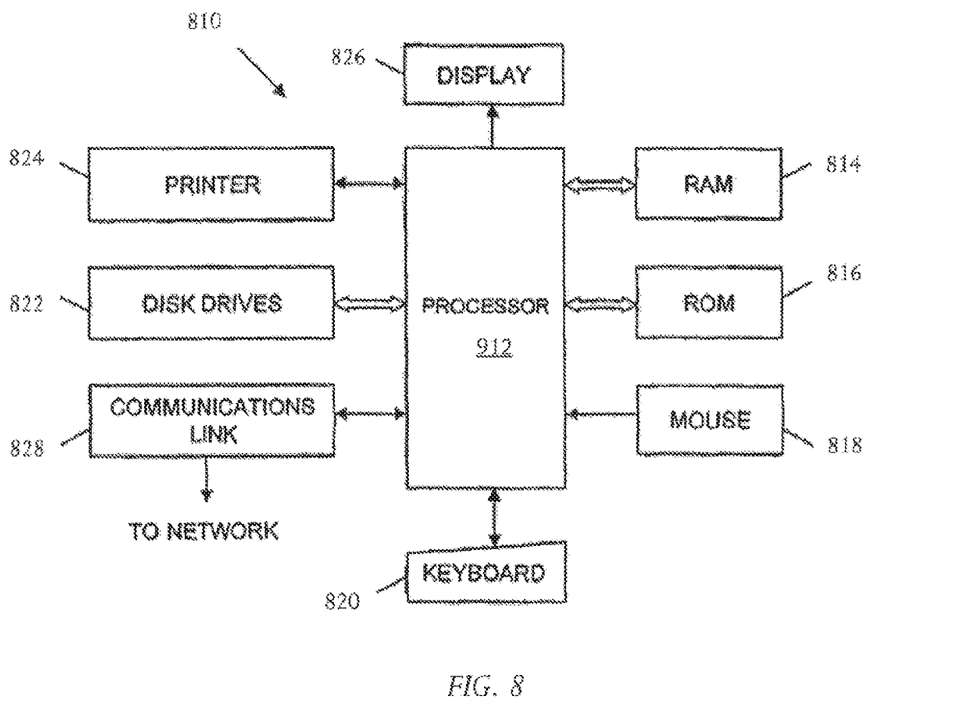
FIG. 8 is an embodiment of a general purpose computer that may be used in connection with other embodiments of the disclosure to carry out any of the above-referenced functions and/or serve as a computing device for the endpoint(s) of FIG. 1.

The functionality of the above description, once again, may avail from any of the components described in FIGS. 1 and 8 or other suitable components. The code, itself, may be written in any suitable format, including but not limited to Java, C++, C-sharp, HTML, HTML5, and the like.

Figure 2A:
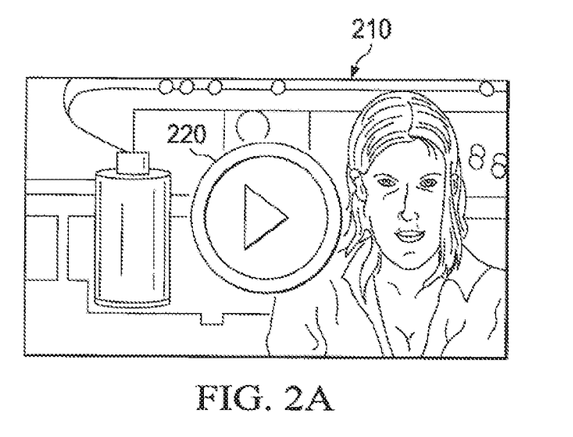
FIGS. 2A, 2B, 2C reference how a content container is enhanced for peer-assisted shopping, according to embodiments of the disclosure.
Figure 2B:
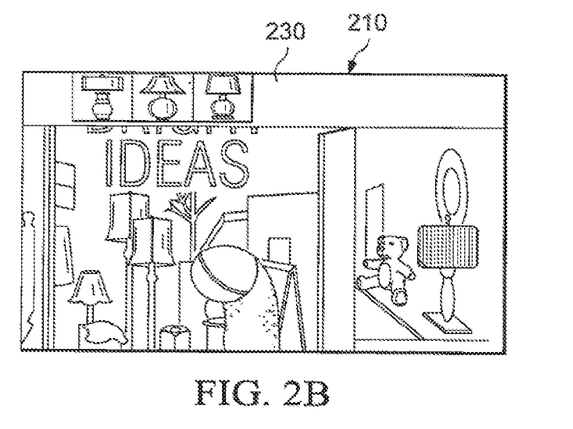
Figure 2C:
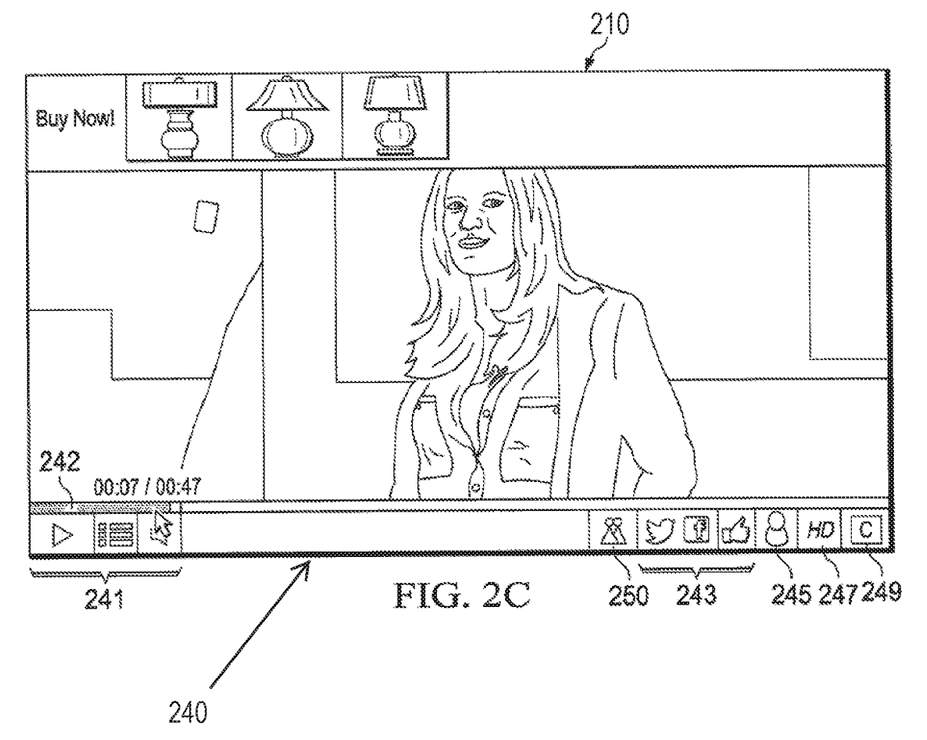

FIGS. 2A, 2B, 2C reference how a content container is enhanced for peer-assisted shopping, according to embodiments of the disclosure. According to certain embodiments of the disclosure, the concept of shopping with friends or family is emulated. Specifically, the person with whom you are shopping with need not be physically present. However, one is able to communicate and solicit feedback from such a person as though they were shopping with them. As discussed below, a "peer" in particularly embodiments may be a friend or family member. In other embodiments, a "peer" may be one who is not readily known to a person.

With reference to FIGS. 2A and 2B, a container 210 is shown. In this container 210, the viewable content is video (as indicated by the play button 220); however, in other configurations that will be described below, the container 210 may include images, live-video feeds, and other types of content. In FIG. 2B, the video has been initiated and a selectively displayable product carousel 230 with a plurality of products is shown. In particular configurations, these products correspond to the products or services being shown in the content within the underlying container (here, a video). Although shown on the top portion overlaying the video, the product carousel 230 may be on the sides or bottom of the container 210—overlaying the container 210 or not in other configurations. For example, the product carousel may expand from or be positioned outside of the container 210. Additionally, varying degrees of transparency may be used in the product carousel 230. Or, the product carousel 230 may not be transparent.

A user viewing the container 210 may interact with the displayable product carousel 214 and purchase items or transact without leaving the container 210. For example, with reference to a container on a Facebook™ wall of a friend, a user may purchase the product directly from the container and the wall. In other configurations, a user may leave the container 210 and be redirected to a website.

With reference to FIG. 2C, additional features of the container 210 are shown. For example, a selectively displayable toolbar 240 is shown at least partially overlaying a bottom of the container 210. Although shown on the bottom portion overlaying the video, the toolbar 240 may be on the sides or top of the container 210—overlaying the container 210 or not in other configurations. For example, the toolbar 240 may expand from or be positioned outside of the container 210. Additionally, varying degrees of transparency may be used in the toolbar 240. Or, the toolbar 240 may not be transparent.

A variety of typical options are provided in the toolbar, including play and audio options 241, share options 243, account login options 245, video quality options 247, and further information options 249. The play and audio options 241 will become apparent to one of ordinary skill in the art upon reading this disclosure. Also shown is a play bar 242, which will become apparent to one of ordinary skill in the art.

Upon clicking on the share options 242, a variety of other options may be provided. For example, a user may be given the opportunity to share the container via networks such as Facebook, Myspace, Twitter, Yahoo, LinkedIn, Google, or Wordpress. Furthermore, the user may be given the option to copy embed codes, and share via email. Additionally, a user may be able to propagate the container by clicking the "like" thumb or "+1"ing on Google Plus.

The account login options 245 may allow a user to sign-into a variety of networks including, for example, Cinsay, Facebook, or Google. The video quality options 247 allow modification of the video, and the further information options provides any of a variety of options one may one to provide about the container.

A peer-assisted shopping option 250 is also provided to allow communication with one or more other endpoint. For example, in particular embodiments, a user may be shopping at home on their computer, tablet, or television and upon seeing something they like, initiate a communication with a peer. Alternatively, in other embodiments, a user may be shopping in a store and see a particular item they like and initiate communication with a peer using and share what they are viewing, for example, use camera capture features on their mobile device (e.g., a phone, tablet, or Google Glass). This communication may be initiated by selecting the peer-assisted option 250. In particular embodiments, this may involve selecting with a mouse pointer, a finger, or a stylus. Alternatively, activations may occur with certain movement detected by sensors in the device or voice activation.

Again, although the underlying content for the container will be described as a video in particular configurations, the underlying content may be other items including, but not limited to, just-taken pictures and real-time video fees.

The method and/or manner of communicating between endpoints is virtually limitless. Non-limiting examples of communication channels are provided above with reference to FIG. 1. Any of these communications and others may be utilized for initiating communication between end users. For example, upon clicking on the peer-assisted shopping option 250 in FIG. 2C, a list of contacts can be brought up. These contacts may be contacts on a device associated with an endpoint, contacts within a network, or other people as will be described below. In particular embodiments, only contacts that are currently connected to a network that is common to the first user (e.g., Facebook, Google+, Cinsay, or others) may be shown as options. In other configurations, a general list of contacts will be shown.

The following are non-limiting examples of initiating the communication between two end-users: short messaging service, online presence, a join-me link that displays in whatever interface they may currently be using, an email, a blast of messages to a group, or messages to specific friends. In particular embodiments, no account is needed; rather, the specific linkage between two end-devices is established through the connection parameters. As will be recognized by one of ordinary skill in the art reviewing this application, in certain embodiments, the communication may be direct (peer-to-peer) while in others in may indirect through servers which relay messages. In yet other configurations, the communications may be a hybrid of the two.

The following are non-limiting examples of methods of which end-users can communicate with one another: voice over IP (VOIP), video chat, text chatting, or phone call. Such communications are in addition to the content (e.g., digital content) that may be shared between the user. In particular embodiments, the manners of communication may be dependent on the capability of the particular device.

Figure 3:
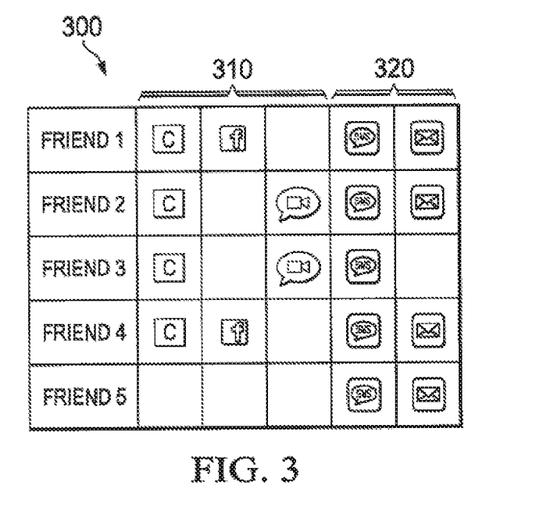
FIG. 3 shows an example interface 300 of initiating contact between endpoints in peer-assisted shopping, according to an embodiment of the disclosure

FIG. 3 shows an example interface 300 of initiating contact between endpoints in peer-assisted shopping, according to an embodiment of the disclosure. Upon clicking on the peer-assisted shopping option 250 in FIG. 2C, the interface 300 may be displayed. In particular configurations, the interface may be transparently displayed over a container.

In the interface 300, connection options 310 represent options for connecting to someone who is currently connected a network such as Cinsay, Facebook, or Video (e.g., Skype). If the user is not connected to such a network, the option is not shown. In such a connection option, a message may be propagated through the appropriate network asking the recipient to join the requestor in peer-assisted shopping. Upon responding "OK," the receiving user may be taken to a container interface. Connection options 320 represent other manners of initiating contact with a person, for example, using short-messaging-service (SMS), or email. In these options, a link may be provided to the container interface.

When a container is invoked, the container determines the endpoint's environment and communication options. For example, the container may determine whether video chat is available, whether the bandwidth on the network is appropriate for certain communication techniques, whether VOIP chatting is an option, whether text chatting is an option, and whether mobile phone access is available (e.g., using a carrier such as AT&T, Verizon, Sprint, or T-Mobile).

In particular embodiments, a user may have multiple devices. Accordingly, a connection attempt can be sent in parallel to multiple different devices.

Figures 4, 5:
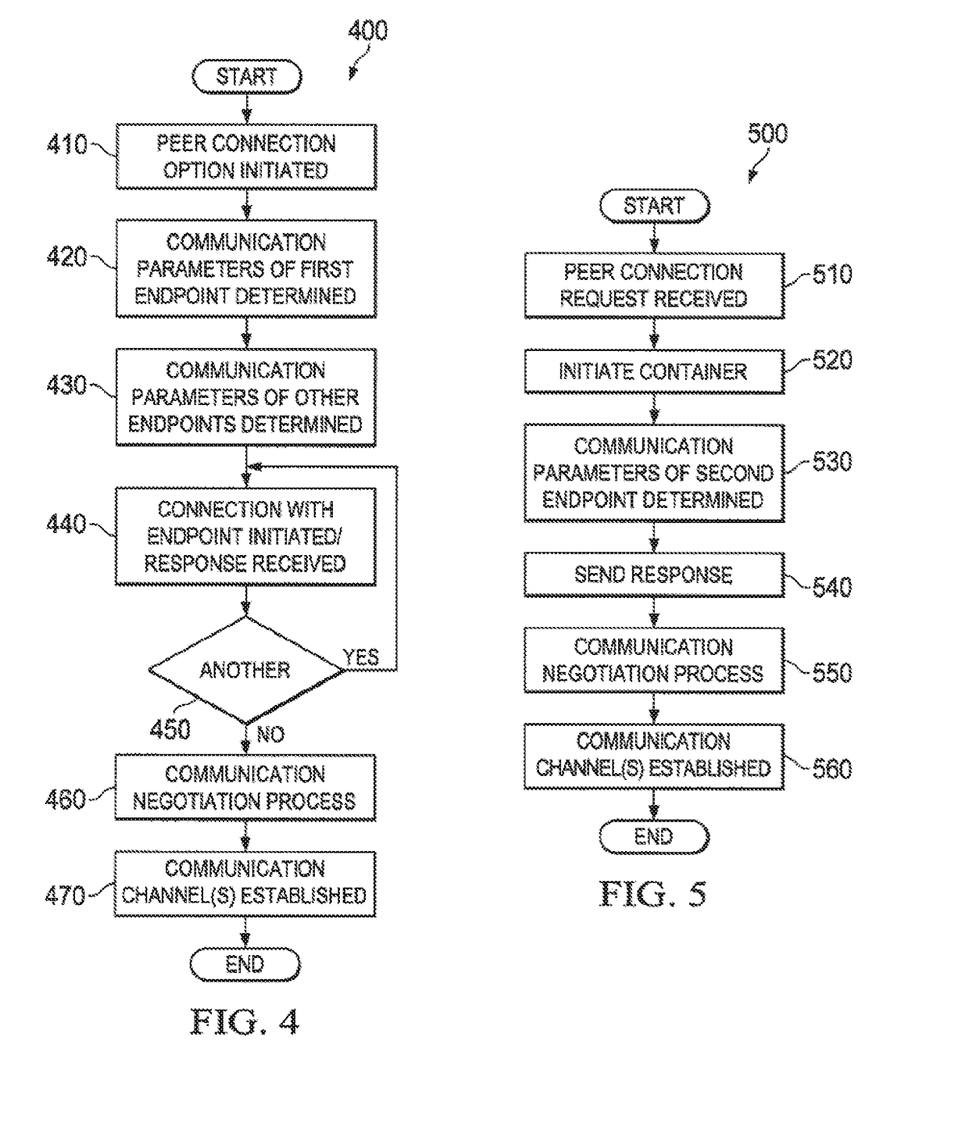
FIGS. 4 and 5 show processes for establishing communication between different endpoints, according to embodiments of the disclosure.

FIGS. 4 and 5 show processes 400, 500 for establishing communication between different endpoints, according to embodiments of the disclosure. FIG. 4 shows a process 400 on a first requesting endpoint whereas FIG. 5 shows a process 500 on a second receiving endpoint.

With reference to FIG. 4, the process 400 at the first endpoint begins at step 410 with a peer connection option being initiated. As referenced above, this may be a mouse click, a tap by a finger on a part of screen, or a stylus touching a screen. Additionally, it may be activated with a remote for a networked television, voice activation, or using a sensor such as proximity detector (e.g., a wave). Yet other activation techniques will become apparent to one of ordinary skill in the art after review of the disclosure.

At step 420, communication parameters of the first endpoint are determined. According to particular configurations, this may include determining the methods of communication available on the first endpoint (e.g., determining whether voice, chat, video are available), the nature of such channels (e.g., bandwidth—connected via WIFI, 3G, 4G, etc). According to particular configurations, this may also include a determination of which networks the first end point is currently connected to (e.g., Cinsay, Facebook, Google). In particular configurations, a user of a device may configure method of communication (e.g., only video chat if connected via WI-FI or turn video chat off).

At step 430, available communication parameters of other potential endpoints are determined. According to particular configurations, this may include determining which networks peers are currently connected to (e.g., Cinsay, Facebook, Google). This may also include determining what methods of communication one has in communicating with an end user. For example, as reference above, a particular person may have multiple devices. And, it is not clear which device or device the person is currently using—if at all. Thus, when considering peers, multiple different devices for single person may be considered.

In particular configurations, a user may also be prompted to enter communication parameters. For example, they may want to communicate with a friend and enter his or her telephone number for an SMS message.

At step 440, communications with at least a second endpoint is initiated awaiting receipt of a response. In particular configurations, messages may be sent in parallel to a second user (e.g., in-application message via Facebook/

Cinsay and text message). If the user is at his or her desktop, they may prefer to communicate with a desktop computer as opposed to a mobile device.

At step 450, a determination is made as to whether other messages should go out to other endpoints. This is because particular configurations allow group settings where the peer-assisted shopping is amongst a group of friends. If yes, the process repeats at step 440. If no, the process 500 moves on.

At step 460, there is a negotiation process between the endpoints to determine how communication will occur. In this negotiation, the communication capability of each respective endpoint is considered. The negotiation process may be partially carried out on each respective endpoint. Alternatively, a server operates as an intermediary and devices. Or, one device may control the negotiation process communication setup.

Negotiation is used in particular embodiments because, for example, the second endpoint may only be able to communicate via messaging due a lack of a camera or a microphone. Accordingly, messaging may be determined as a suitable communication technique. In particular configurations, the negotiation process of step 460 may take into consideration other devices that are also communicating as well as the particular content feed within the container. In particular configurations, the first end point can communicate with multiple endpoints using disparate technologies. For example, communication between a first and second endpoint may be video chatting whereas communication between the first and third endpoints and the second and third endpoints is text chatting. Accordingly, the negotiation process may determine how to efficient handle such disparate technologies.

At step 470, the respective communication channels are established with each of the respective endpoints using suitable connection parameters.

According to particular embodiments, the process 400 of FIG. 4 may take only a couple of seconds—depending on the computing power and network latency. In certain configurations, the process 400 may take less than a second. In other configurations, the process 400 may take more than a couple of seconds.

With reference to FIG. 5, the process 500 at a second endpoint begins at step 510 with a peer connection request being received at a second endpoint. As referenced above, in particular configurations, multiple parallel requests may be sent to a particular user who may have multiple devices. Several of these types of messages may be received on a particular endpoint. For example, a text message may be received as well as an in-app message (e.g., on Facebook or Cinsay). In particular configurations, the user upon seeing the message can choose to accept the invitation to connect. As a non-limiting examples, a user may click on a link or hit a button that confirms acceptance.

At step 520, a container for the communication is initialized. In particular configurations, the container may have features that correspond to a pre-installed application on a device. In other configurations, the container may correspond to application features that are propagated on the fly, for example, using embed codes.

At step 530, communication parameters of the second endpoint are determined. This may include initiating determination actions similar to those described above with reference to step 420 of FIG. 4 except with reference to the second endpoint. At step 540, a response is sent to the first endpoint.

At step 550, there is a negotiation process between the endpoints to determine how communication will occur. This is similar to the step 460 in FIGURE except from the perspective of the second endpoint.

At step 560, communication channels are established, which is similar to step 470 of FIG. 4.

In particular embodiments, a second endpoint that received a request and established a link with the first endpoint may, in turn, undergo the process 400 of FIG. 4 using an "add-a-friend" feature. In such an embodiment, approval may or may not be required by the first endpoint. In repeating the process 400, the negotiation between endpoints may consider the link that has already been established between the first or second endpoint.

Figure 6:
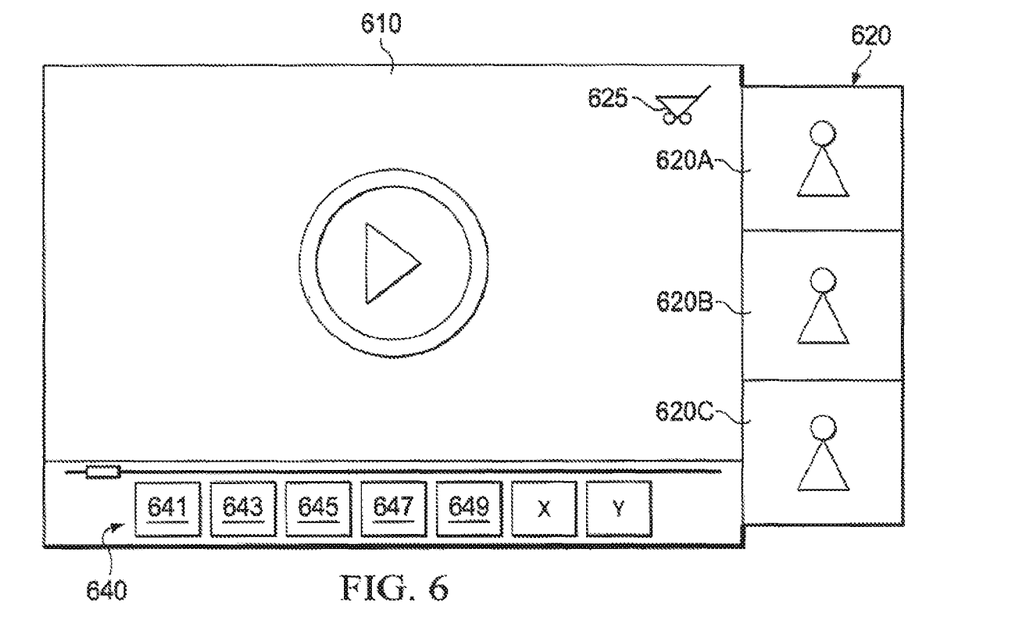
FIGS. 6 and 7 shows non-limiting examples of peer-assisted shopping communication interfaces, according to embodiments of the disclosure.
Figure 7:
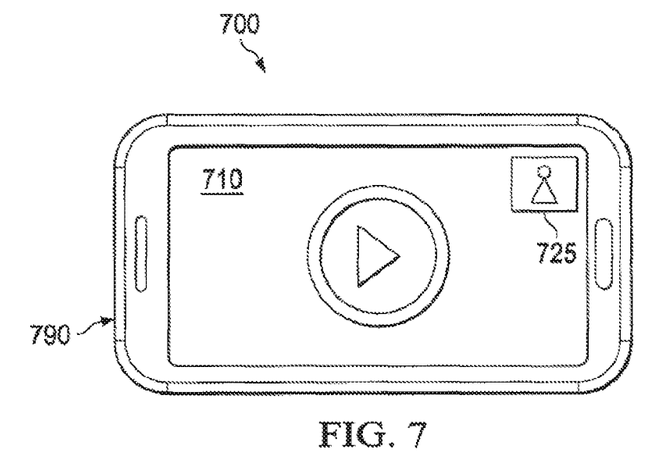

FIGS. 6 and 7 shows non-limiting examples of peer-assisted shopping communication interfaces 600 and 700, according to embodiments of the disclosure. Interface 600 may exist on any suitable device whereas interface 700 is shown as existing on a mobile device. In this particular embodiment, the underlying content is a video. Again, as referenced above, in other configurations, the underling content may be other items such a real-time video feed. In such an alternative configuration, a first device may capture video and send in real-time to a second device—either directly or through a server intermediary.

With reference to FIG. 6, a container 610 is generally shown which may have features similar to those descried above with reference to FIGS. 2A, 2B, and 2C.

A box 620 has been extended from one edge of the container 610 to show that the user is communication with three different people. The box 620 is shown partitioned into three portions 620A, 620B, and 620C—each portion corresponding to a particular user. Although this particular interface is shown, others may be utilized. For example, the box 620 may show up as an overlay over the content. Additionally, the interface may be hidden upon command with, for example, only voice being propagated. Additionally, portions or all of the box 620 may take on a chat room interface if messaging is utilized.

In particular configurations, a user may be allowed to interact with a portion of the box corresponding to a particular person. For example, a user may click on a portion 620A corresponding to a particular person to discover what is in that person's shopping chart.

As referenced above, disparate technologies may be utilized in certain configurations. Accordingly, for example, portions 620A and 620C may show a video chat interface whereas portion 620B may be messaging chatting. In particular embodiments, conversions technologies may be used to convert text-to-voice or voice-to-text in order to accommodate for scenarios requiring different communication techniques. The conversion process may occur anywhere in the communication chain—at either device or at a server.

A variety of tools 640 are also shown to facilitate the communication between the end users. In particular configuration, the tools 640 may replace some of the tools 240 shown in FIG. 2C. Although shown in the lower portion of the container 610 in this configuration, this toolset may be take on almost any configuration and can be selectively shown (and hidden) in any of a variety of manners. As a non-limiting example, the tools 640 may be invoked by hovering over a lower portion of the container or right clicking on the container.

A non-limiting example of tools include, a share shopping cart feature 641, a share particular location in video feature 643, a share current content feature 645, a sync feature 647 request to sync the playing of video and corresponding start location at a particular location so that two people may view the same thing at the same time, a commenting or tagging feature 649. Other features, designated "x" and "y" may additionally be incorporated.

The share shopping cart feature 641 allows one user to allow the peers to view the items in the shopping cart 625. The shopping cart 625, itself, may contain reverse links back to the location where the item was added. For example, it may contain a respective location in a video where the product was viewed and added to the cart.

The share particular location in a video feature 643 may enable one user to direct another user to a particular location in a video. For example, one user may like a particular product (e.g., shoes) in a video and choose to share that particular location with one of the peers.

The share current content feature 645 enables the sharing of the current content one is viewing through the container. For example, if the content is a video, the video may be shared. If content is real-time view of something, the real-time view may be recorded with both a camera and either pictures or video may be sent to the second user.

The sync feature 647 may allow a sync of views by different devices. For example, a first user may wish that a second user view the same thing they are viewing. Accordingly, initiating this feature allows the views to sync. In initiating this feature, a user may choose a start position of a particular video. The devices can communicate as necessary so that playback is in sync.

The comment or tagging feature 649 allows a user to comment on a time-based and/or coordinate-based portion of the content. For example, a first user may want to circle certain shoes at a certain time in the video and share with their peers. Any suitable annotation features may be utilized. The annotations may store the time and coordinates.

Also shown is a shopping cart 625, which a user may use to place items. The shopping cart 625 may be shared with the peers—allowing each respective peer to provide feedback.

With reference to FIG. 7, a container 710 on a mobile device 790 is generally shown. This container 710 may contain features similar to those described above with reference to FIGS. 2A, 2B, and 2C. In particular embodiments, the container 710 may cover the entire screen with other interfaces selectively provided to cover a portion of the interface. For example, as shown, a box 720 containing communication features (e.g., video or text chat) may overlay a portion of the container.

With reference to various FIGURES herein, a concept of a shared shopping cart may additionally be utilized. The shared shopping cart provides access to a common shopping cart to a group of people. According to certain embodiments, the contents of the shared shopping cart may contain an identifier of who added the item along with a link-back to the location from where it came, which may be a video.

Shared shopping carts may be used in a variety of settings. For example, a shared shopping cart may be utilized for a group planning for a party with each added item showing the others in the group what they intend on buying. Additionally, for high school girls attending a prom, a shared shopping chart may be utilized so that each may see what the other intends on wearing to the prom. For items in the shared shopping cart, individuals may be able to comment on the items. Additionally, where a particular shared item has been annotated, the shared shopping cart may indicate that the item has a comment in the linked back object, which may be a video.

Despite the shopping carts being shared, in particular embodiments, individual checkouts may occur. When such a checkout has occurred, a notification in the shopping cart may be placed indicting that a particular item has been purchased. Alternatively, if all the items in the cart are shared purchase-wise, each person may have an individual check-out for their portion of the overall amount.

In particular embodiments, whether or not something is a shared in a cart can be define by permissions. For example, an individual cart may begin as an individual cart and quickly be turned into a shared shopping cart by changing permission.

With reference to various FIGURES herein, solicitation of feedback may be product or service specific and seek general feedback from non-friends and non-family members. For examples, embodiment may allow a user to solicit feedback on products or services from other individuals who had purchased or reviewed product or service in the past or opted in for peer-assisted shopping participation and active solicitation. In yet other configurations, users may solicit information from non-connected users from other networks that the particular user may utilize. In such configurations, the solicitation of information may also encourage the solicited individual to become a user of Cinsay's network. As a non-limiting example, one could have a Facebook or Google+ post that is automatically posted by Cinsay's technology, asking friends, groups, circles, or the general for input on a particular product. In particular configurations, an individual may simply engage in a response. In other configurations, an individual may be prompted to become a Cinsay network participant user or to simply associate their current network (e.g., Facebook or Google+) with a Cinsay account. In either configuration, the user may be given a variety of control configurations as to who is solicited. As non-limiting examples, the user may have the option to solicit by friends, groups or circles in Facebook or Google+ accounts, to solicit by geographic region (e.g., city, metropolitan area, region, or state), to solicit by those having certain technological capability (e.g., those that can video chat), to solicit those who purchased with a certain time frame (e.g., when such purchase statistics are available), to solicit those who purchased from the same company in which a purchase is contemplated, to solicit every known purchaser of the product, or any other criteria or combinations of the proceeding.

Active solicitation may take form of video conversation, chat, short messaging service (sms), email or any other form of electronic communication facilitated by the technology. In particular configurations, the receipt of such solicited message may be an opt-in or opt-out scenario. Similar configurations—similar to those provided above—may also be placed on the receipt of messages. For example, receive solicitations from friends, groups or circles in Facebook or Google+ accounts, receive solicitations by geographic region (e.g., city, metropolitan area, region, or state), receive solicitations by those having certain technological capability (e.g., only those that can video chat), receive solicitations by those who have are contemplating purchased from the same company the user purchased, an other criteria or combinations of the proceeding.

Upon product or service selection, a user may additionally be presented with a product or service reviews, ratings or feedback from other product or service users. Current users may choose to solicit additional feedback on a product or service of interest from other users in their network or peer-assisted shopping participants who have opted in for active solicitation and peer-assisted shopping process.

Active solicitation is facilitated by the technology and may occur synchronously or asynchronously in real-time or delayed fashion.

Peer-assisted shopping or active solicitation participants may or may not receive compensation for the rendered assisted services. In cases where service compensation in rendered it may include such form of payments as credits, discounts, virtual currency and legal tender.

Unlike general comments on products, certain embodiments provide an actual real-time question/answer session about the product or service.

FIG. 8 is an embodiment of a general purpose computer 810 that may be used in connection with other embodiments of the disclosure to carry out any of the above-referenced functions and/or serve as a computing device for endpoint(s) 110 and endpoint(s) 120 of FIG. 1. General purpose computer 810 may generally be adapted to execute any of the known OS2, UNIX, Mac-OS, Linux, Android and/or Windows Operating Systems or other operating systems. The general purpose computer 810 in this embodiment includes a processor 812, a random access memory (RAM) 814, a read only memory (ROM) 816, a mouse 818, a keyboard 820 and input/output devices such as a printer 824, disk drives 822, a display 826 and a communications link 828. In other embodiments, the general purpose computer 810 may include more, less, or other component parts. Embodiments of the present disclosure may include programs that may be stored in the RAM 814, the ROM 816 or the disk drives 822 and may be executed by the processor 812 in order to carry out functions described herein. The communications link 828 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 822 may include a variety of types of storage media such as, for example, floppy disk drives, hard disk drives, CD ROM drives, DVD ROM drives, magnetic tape drives or other suitable storage media. Although this embodiment employs a plurality of disk drives 822, a single disk drive 822 may be used without departing from the scope of the disclosure.

Although FIG. 8 provides one embodiment of a computer that may be utilized with other embodiments of the disclosure, such other embodiments may additionally utilize computers other than general purpose computers as well as general purpose computers without conventional operating systems. Additionally, embodiments of the disclosure may also employ multiple general purpose computers 810 or other computers networked together in a computer network. Most commonly, multiple general purpose computers 810 or other computers may be networked through the Internet and/or in a client server network. Embodiments of the disclosure may also be used with a combination of separate computer networks each linked together by a private or a public network.

Additionally, in particular embodiments, the general purpose computers 810 computers may be mobile devices that include features such as cameras, camcorders, GPS features, and antennas for wireless communications. Mobile devices such as these include those marketed as iPhone and Android phones.

Several embodiments of the disclosure may include logic contained within a medium. In the embodiment of FIG. 8, the logic includes computer software executable on the general purpose computer 810. The medium may include the RAM 814, the ROM 816, the disk drives 822, or other mediums. In other embodiments, the logic may be contained within hardware configuration or a combination of software and hardwire configurations.

The logic may also be embedded within any other suitable medium without departing from the scope of the disclosure.

It will be understood that well known processes have not been described in detail and have been omitted for brevity. Although specific steps structures and materials may have been described, the present disclosure may not be limited to these specifics, and others may be substituted as it is well understood by those skilled in the art, and various steps may not necessarily be performed in the sequences shown.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A computer-implemented method, comprising:

receiving captured media content;

identifying one or more products or services associated with the captured media content;

instantiating, at a first compute device, a transacting media container configured to support a media presentation interface configured to present media content associated with the captured media content, a control interface configured to initiate and control communication with at least one peer compute device during the presentation of the media content, and a transaction interface configured to list and allow transactions involving at least one product or service from the identified one or more products or services during presentation of the media content, the control interface including a share tool configured to allow sharing of at least one of the media content and/or at least one product or service listed in the transaction interface from the first compute device with the at least one peer compute device;

receiving, at the first compute device, a first command from a first user, the first command to initiate a communication with an at least one peer compute device, the at least one peer compute device associated with at least one second user;

rendering, on a graphical display of the first compute device, via the transacting media container, the media presentation interface displaying the media content, the control interface including an at least one indicator associated with the at least one second user and the transaction interface listing at least one product or service from the identified one or more products or services;

initiating, based on selection of the at least one indicator by the first user, at least one network communication channel from the first compute device to at least one peer compute device associated with the at least one second user associated with the selected at least one indicator; and transmitting, via the at least one network communication channel, digital data corresponding to the media content and at least one product or service listed in the transaction interface of the first compute device, the digital data configured to synchronize media content on the first compute device with media content on the at least one peer compute device associated with the at least one second user.

2. The computer-implemented method of claim 1, wherein the captured media content is captured via the first compute device.

3. The computer-implemented method of claim 1, wherein the first compute device is a mobile compute device, and the captured media content comprises media content captured real-time by the mobile compute device.

4. The computer-implemented method of claim 1, wherein media content includes one or more images.

5. The computer-implemented method of claim 1, wherein media content includes video content.

6. The computer-implemented method of claim 1, wherein media content includes a real-time video feed.

7. The computer-implemented method of claim 1, wherein at least two peer compute devices are associated with a second user associated with an indicator selected by the first user, and wherein transmitting digital data corresponding to the media content and at least one product or service listed in the transaction interface of the first compute device includes transmitting digital data via a first network communication channel to a first peer compute device of the at least two peer compute devices associated with the second user, and transmitting digital data via a second network communication channel to a second peer compute device of the at least two peer compute devices associated with the second user.

8. A computer-implemented method, comprising:
receiving captured media content;
identifying at least one of a product or a service associated with the captured media content;
defining, at a first compute device, (i) a media container configured to present media content associated with the captured media content, and (ii) a transaction interface configured to identify a transaction involving the at least one of the product or the service during presentation of the media content;
receiving, at the first compute device and during a presentation of the media content, a command from a first user to initiate a communication with a second compute device that is associated with a second user;
transmitting, to the second compute device, digital data corresponding to (i) the media content and (ii) the transaction identified in the transaction interface, the digital data configured to synchronize media content on the first compute device with media content on the second compute device; and
establishing a communication channel with the second compute device based on the second compute device receiving the digital data.

9. The computer-implemented method of claim 8, wherein the digital data includes a second media container configured to present the media content and a second transaction interface configured to list the transaction.

10. The computer-implemented method of claim 8, wherein:
the communication with the second compute device is via a first communication channel and a first communication technology;
the media container is further configured to establish a second communication channel with a third compute device different from the second compute device; and
the second communication channel is via a second communication technology different from the first communication technology.

11. The computer-implemented method of claim 8, wherein:
the digital data is configured to, upon instantiation at the second compute device, cause the second compute device to identify the transaction, the method further comprising:
transmitting, to the second compute device, an updated digital data configured to, upon instantiation at the second compute device, cause the second compute device to present updated information associated with the transaction.

12. The computer-implemented method of claim 8, wherein the digital data includes a copy of the media content and is configured to, upon instantiation at the second compute device, synchronize playback of the copy of the media content on the second compute device with playback of the media content at the first compute device.

13. The computer-implemented method of claim 8, further comprising:
determining a set of communication parameters between the first compute device and the second compute device wherein the set of communication parameters includes information to form a direct peer-to-peer connection between the first compute device and the second compute device; and
negotiating, based on the set of communication parameters, the communication channel with the second compute device.

14. The computer-implemented method of claim 8, further comprising:
determining a set of communication parameters between the first compute device and the second compute device wherein the set of communication parameters includes information to form an indirect connection between the first compute device and the second compute device via a server; and
negotiating, based on the set of communication parameters, the communication channel with the second compute device.

15. The computer-implemented method of claim 8, further comprising:
determining a set of communication parameters between the first compute device and the second compute device wherein the set of communication parameters includes information to form a hybrid connection between the first compute device and the second compute device, the hybrid connection including a direct peer-to-peer connection and an indirect connection via a server; and
negotiating, based on the set of communication parameters, the communication channel with the second compute device.

16. The computer-implemented method of claim 8, further comprising:
determining a set of communication parameters between the first compute device and the second compute device wherein the set of communication parameters includes information related to a list of available methods of communication between the first compute device and the second compute device.

17. The computer-implemented method of claim 8, further comprising:
determining a set of communication parameters between the first compute device and the second compute device wherein:

the set of communication parameters includes information related to a list of available methods of communication between the first compute device and the second compute device; and the set of communication parameters includes information related to properties of the list of available methods of communication between the first compute device and the second compute device.

18. The computer-implemented method of claim 8, further comprising:

determining a set of communication parameters between the first compute device and the second compute device wherein the set of communication parameters includes information related to a list of available networks for communication between the first compute device and the second compute device.

* * * * *